United States Patent
Alet et al.

[11] Patent Number: 6,077,078
[45] Date of Patent: Jun. 20, 2000

[54] MOTION SIMULATOR DEVICE WITH AT LEAST THREE DEGREES OF FREEDOM

[75] Inventors: Robert Alet, Courdimanche; Roland Jezequel, Gargenville, both of France

[73] Assignee: Thomson-CSF, Paris, France

[21] Appl. No.: 08/956,395

[22] Filed: Oct. 23, 1997

[30] Foreign Application Priority Data

Dec. 27, 1996 [FR] France ................................ 96 16112

[51] Int. Cl.[7] ........................................................ G09B 9/08
[52] U.S. Cl. ............................ 434/55; 434/29; 434/58; 472/59; 472/130
[58] Field of Search .................................. 434/29, 55, 57, 434/58, 45, 59, 62, 365, 372; 472/59, 60, 29, 130, 1; 248/163.1, 396; 403/36, 39, 77, 90, 143; 700/56, 302, 305; 395/500.29

[56] References Cited

U.S. PATENT DOCUMENTS

| | | | |
|---|---|---|---|
| 3,295,224 | 1/1967 | Cappel | 434/58 |
| 3,577,659 | 5/1971 | Kail | 434/58 |
| 3,597,857 | 8/1971 | Akister et al. | 434/58 |
| 3,619,911 | 11/1971 | Pancoe | 434/58 |
| 4,343,610 | 8/1982 | Chou | 434/58 |
| 4,496,323 | 1/1985 | Alet et al. . | |
| 4,576,577 | 3/1986 | Lam et al. | 434/58 |
| 4,650,420 | 3/1987 | Alet et al. . | |
| 4,812,000 | 3/1989 | Rouille et al. . | |
| 4,887,967 | 12/1989 | Letovsky et al. . | |
| 5,018,973 | 5/1991 | Alet et al. . | |
| 5,022,708 | 6/1991 | Nordella et al. . | |
| 5,366,375 | 11/1994 | Sarnicola | 434/55 X |
| 5,513,990 | 5/1996 | Gluck | 472/59 X |
| 5,533,935 | 7/1996 | Kast | 472/130 |
| 5,564,985 | 10/1996 | Engstrand | 472/60 |
| 5,597,359 | 1/1997 | Byerly | 434/55 X |
| 5,605,462 | 2/1997 | Denne | 434/55 |
| 5,719,763 | 2/1998 | Leyden | 700/56 |
| 5,752,834 | 5/1998 | Ling | 434/58 |

FOREIGN PATENT DOCUMENTS

| | | |
|---|---|---|
| 0 373 029 | 6/1990 | European Pat. Off. . |
| 2 677 155 | 12/1992 | France . |
| 2 745 656 | 9/1997 | France . |
| 6-210066 | 8/1994 | Japan . |

*Primary Examiner*—Joe H. Cheng
*Attorney, Agent, or Firm*—Oblon, Spivak, McClelland, Maier & Neustadt, P.C.

[57] ABSTRACT

The disclosed motion device comprises a triangular platform supporting a load, for example a simulator cabin. This platform is supported at all three corners by hinged arms driven by cranks that are moved by an actuator. There is provided a load compensation device facilitating the work of the actuators. Thus the load can be moved in pitch and roll as well as vertically.

12 Claims, 4 Drawing Sheets ved by three electric motors and enables the load to be moved along the axes of pitch, roll and vertical displacement with maximum possible amplitudes of angular motion that are limited to approximately ±13°. This is enough for certain simulation applications for which the compactness of the device is a major criterion.

MOTION SIMULATOR DEVICE WITH AT LEAST THREE DEGREES OF FREEDOM

BACKGROUND OF THE INVENTION

1. Field of the Invention

The present invention pertains refers to a modular device for the putting into motion of loads with at least three degrees of freedom.

2. Description of the Prior Art

The French patent No. 2 745 656 describes a known compact device for the putting into motion of loads such as a simulator cabin with three degrees of freedom. This device is moved by three electric motors and enables the load to be moved along the axes of pitch, roll and vertical displacement with maximum possible amplitudes of angular motion that are limited to approximately ±13°. This is enough for certain simulation applications for which the compactness of the device is a major criterion.

However, certain applications require greater maximum amplitudes of angular motion, namely values in the range of ±25, in order to enable the reproduction of sensations specific to the requirements of simulation. These applications are, for example, the simulation of movements in highly uneven or mountainous terrain.

In addition, there are known major systems with six degrees of freedom implementing six jacks, making it possible to obtain high maximum amplitudes of angular motion. However, these systems are very costly, in particular because of the use of hydraulic jacks and their control device (with power unit and hydraulic jacks, the simultaneous control of six axes etc.).

There is a known low-cost device, described in the document EP-A-0 373 029, for putting a load into motion. This device uses three electric motors. On the driven shaft of each electric motor, there is mounted a crank, connected by a suspended-rod type hinge to a corresponding tip or corner of a triangular platform. This known device is satisfactory in certain applications that do not require high maximum amplitudes of angular motion (in terms of roll and/or pitch motions) of the platform (they require amplitudes of less than about 13°). The suspended-rod type hinge and the cardan joints connecting it to the platform prevent higher maximum amplitudes of angular motion from being communicated to this platform.

SUMMARY OF THE INVENTION

An object of the present invention is a device for putting a load into motion with at least the three above-mentioned degrees of freedom, this device being compact, simple to make and control, having the lowest possible cost price, and enabling the load to be given the most realistic possible motions, with maximum amplitudes of angular motion, at least in roll and/or pitch, that are relatively great (up to about 25°).

The device according to the invention comprises at least three actuators, each fixed to a supporting base plate at the vertices of a substantially regular polygon, each of these actuators rotationally driving a crank connected by a hinged coupling to a corresponding corner of a platform to which the load is fixed, the fixing points on this platform forming the vertices of a polygon whose shape is appreciably homothetical to that of the polygon whose vertices are occupied by the actuators, wherein each hinged coupling comprises at least one connection element connected by one of its ends to the platform by a ball-and-socket type joint, and by the other end to at least one joint that is rotationally mobile, the hinging points of this connection element being appreciably coplanar, their plane being mobile about a horizontal axis passing through the axis of the joint that joins this element to the platform.

Advantageously, when the device has three actuators, they are laid out in an equilateral triangle configuration, and are identical. Also advantageously, the two ends of the rotary driven shaft, parallel to the base plate, of each actuator are each connected to a crank, the two cranks being fixed in the same angular position with respect to the rotary shaft, each of the three connections having an appreciably triangular shape, the ends of its base being connected by a rotary joint to the corresponding cranks, and its corner being connected by a ball-and-socket type joint to the corresponding corner of the platform.

According to one embodiment, the load compensation device comprises a single elongated element with an adjustable spring function, having one end connected by a joint to the center of the supporting base plate and its other end connected by another joint to the center of gravity of the platform.

According to another embodiment, the load compensation device comprises three such elongated elements hinged at each end and respectively connecting each of the corners of the platform to the corresponding corner of the supporting base plate.

According to yet another embodiment, the load compensation device comprises three groups of two elongated elements hinged at each end, the two elements of each group being connected at one their ends to the arm and, at the other end, to the driven shaft of the actuator.

According to another embodiment of the invention, each hinged coupling comprises primarily a pantograph with a median transversal arm that is connected so as to be hinged on said crank.

In all the embodiments, the load compensation device comprises at least either a calibrated spring or a pneumatic jack.

BRIEF DESCRIPTION OF THE DRAWINGS

The present invention will be understood more clearly from the following detailed description of several embodiments, given by way of non-restrictive examples and illustrated by the appended drawings, wherein.

MORE DETAILED DESCRIPTION

The present invention is described here below with reference to a device for putting a simulator cabin into motion, but it is clear that it is not limited to this application, and that it can be implemented in other applications where it is necessary to obtain the movement of loads with at least one degree of freedom, preferably selected from among the motions of roll and/or pitch and/or vertical translation. The invention is particularly advantageous when it is sought to make a low-cost motion device that has a relatively high maximum amplitude of angular motion while at the same time being compact.

Figure 1:
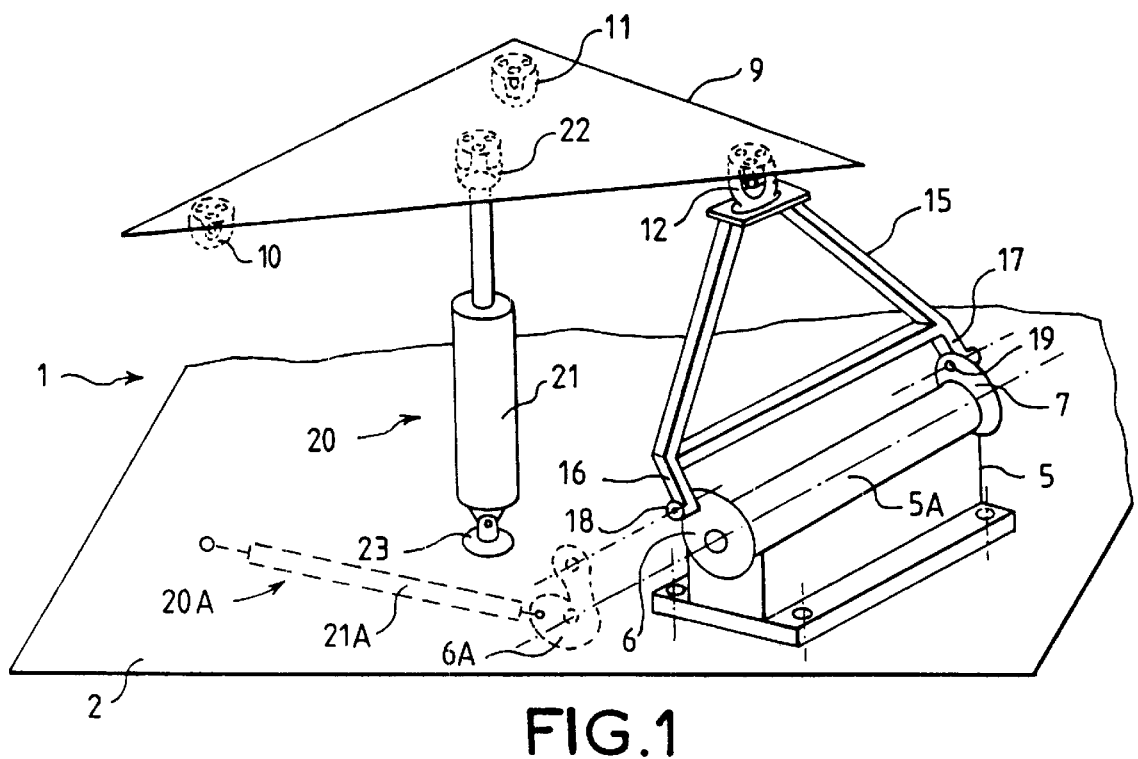
FIG. 1 shows a partial view in perspective of an embodiment of the device of the invention with three degrees of freedom.
Figure 2:
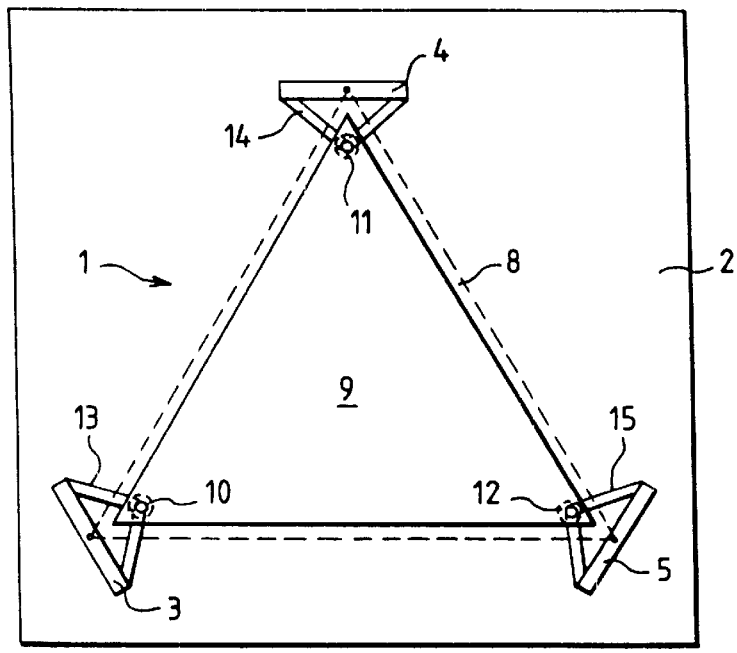
FIG. 2 shows a simplified top view of the device of FIG. 1.

The motion device 1 shown in FIGS. 1 and 2 is intended to move a simulator cabin weighing about 1 to 2 tons for example. The motions produced by the device 1 are roll, pitch and vertical motions or a combination of such motions. The device of FIG. 5, described hereinafter, can be used to obtain other motions.

The device 1 of FIG. 1 comprises a supporting base plate 2. In the present case, the base plate 2 is Is fixed to the ground whereas, in the case of FIG. 5, it is mobile. As an alternative, the base plate 2 may be eliminated and the actuators, described here below, may be fixed directly to the ground. To the base plate 2, there are attached three identical electric actuators, respectively referenced 3, 4 and 5. These actuators are of a type known per se and have not been shown in detail. Each of them has an electric motor with both ends of its shaft "active", i.e. with each end driving a reduction gear. A crank is fixed to the driven shaft of each reduction gear. The driven shafts of the reduction gears have a common axis 5A that is parallel to the axis of the motor or identical with this axis. FIG. 1 shows only the actuator 5 to which the cranks 6 and 7 are fixed. For each actuator, the cranks are fixed in the same angular position with respect to the shaft of the motor. The actuators 3 to 5 are made and fixed to the base plate 2 so that the shafts of their motors are all parallel to this base plate. Furthermore, the centers of the actuators 3 to 5 are positioned at the vertices of a triangle 8 which is preferably, equilateral (see FIG. 2). The shafts of the motors of these actuators are respectively perpendicular to the bisectors of the angles of the triangle 8 coming from the corresponding vertices. If the triangle 8 is an isosceles triangle, the shafts of the motors are then respectively parallel to the opposite sides of the triangle.

Figure 6:
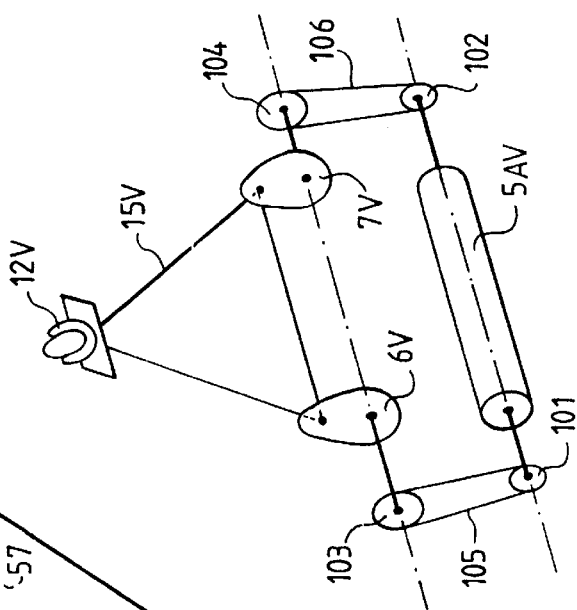
FIG. 6 shows a simplified view of an alternative embodiment of the linking device between actuators and platform of the device of FIG. 1.

The drawing shows a platform 9, in the shape of a triangle, preferably a equilateral triangle which may be either a specific element to which the cabin (not shown) of the simulator is fixed or even the base itself of this cabin. Three joints are fixed to the lower face of platform 9, close to each of its corners. These joints may be, for example, ball-and-socket joints or, preferably, double cardan joints. These joints are referenced 10 to 12, only the one referenced 12 being shown in FIG. 1. Each one of these joints 10 to 12 is connected to the two cranks of the corresponding actuator by a connection arm, respectively 13 to 15. Each of these connection arms has the shape of an isosceles triangle whose "upper" vertex or corner (the one located on the axis of symmetry of the isosceles triangle) is attached to the corresponding joint of the platform 9. Only the arm referenced 15 has been shown in FIG. 1, and it is connected by its vertex or corner to the joint 12. The two other corners of each arm end in two short extensions (16, 17 for the arm 15) whose ends are connected to the ends of the corresponding cranks by a ball-and-socket type joint. In the case of the arm 15, the extensions 16, 17 are connected to the ends of the cranks 6, 7 by the joints 18, 19 whose axes are in the extension of each other and are parallel to the axis of the actuator 5. The dimensions of the base of the arm (15) are such that the extensions (16, 17) externally grip the cranks (6, 7), and the lengths of these extensions and of the cranks are determined so as to enable the full 360° rotation of the cranks, the axes of the joints (18, 19) describing a circle centered on the axis 5A. According to one alternative, partially shown in FIG. 6 (in which the elements similar to those of FIG. 1 are designated by the same numerical references, assigned the suffix V), primary pulleys 101, 102 are fixed to the ends of the driven shaft of the actuator 5AV. These primary pulleys 101, 102 drive secondary pulleys 103, 104 for example by means of belts 105, 106. Cranks 6V, 7V respectively are fixed to the shafts of the pulleys 103, 104. The cranks 6V, 7V are positioned between the pulleys 103 and 104. These cranks 6V, 7V in turn drive the triangular arm 15V, which is connected to the platform 9 by the joint 12V. Of course, the two other actuators (not shown) are connected in the same way as the actuator 5AV to the platform 9.

Figure 3:
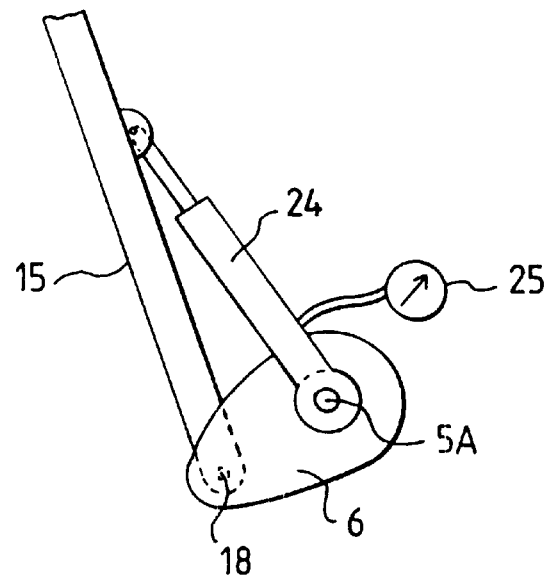
FIG. 3 shows a partial side view of a load compensation device connected to the crank of the device of FIG. 1.

A device 20 to compensate for the weight of the platform 9 and the load resting on this platform is fixed between the platform 9 and the base 2. In the example shown in FIG. 1, this device comprises a pneumatic jack 21 that is connected to the platform and the base plate by a joint such as a ball-and-socket joint or, preferably, a double cardan joint, respectively 22, 23. The fastenings of these joints are centered on the centers of gravity of the platform 9 and of the triangle 8 respectively. As an alternative, the device 20 comprises a calibrated spring. In another alternative, the device 20 comprises three such jacks or calibrated springs whose joints are fixed close to the corresponding vertices of the triangles 9 and 8. According to yet another alternative, shown in FIG. 3, a pneumatic jack or a calibrated spring 24 connects the axis 5A of each crank to the corresponding side of the arm (15 in FIG. 3) driven by this crank. Of course, the jack 24 is supplied by a gas pressure source 25, just like the jack 21 of FIG. 1. According to yet another alternative, the motion device comprises, for each actuator, two compensation devices 20A each connected, on one side, to the platform 2 and, on the other side, to one of the ends of its driven shaft (shaft corresponding to the axis 5A in FIG. 1). Only one of these devices 20A has been represented, in dashes, in FIG. 1. This device 20A comprises an element 21A with a spring function (the function of a draw spring for example) that may be constituted by an elastic cord or a metal spring or an equivalent device. Its connection with the shaft corresponding to the axis 5A is ensured by means of a cam 6A fixed to the shaft corresponding to the axis 5A, close to the crank 6 and fixedly attached in rotation to this crank, for example by means of an attachment to the axis of the joint 18. Of course, the shape of the cam 6A and the fastening point of the device 21A to this cam are determined so that this device 21A exerts, on the axis 5A, a torque that counters the torque exerted on this axis by the platform 9 with its load, via the arm 15, for the totality of the maximum amplitude of angular motion of the crank 6. These devices 20, 20A or 24 have the function of adjusting the force of compensation for the weight of the load (the platform 9 and the load proper such as a simulator cabin), according to the spatial position of the center of gravity of the load.

The motion device described here above makes it possible to move the loads placed on the platform (9) in motions of pitch and roll and in vertical motions (the base plate 2 being assumed to be horizontal) through the composition of the spatial positions of the joints 10 to 12, i.e. of the angular positions of the cranks such as 6 and the 7. The other degrees of freedom (yawing motions and displacements parallel to the plane of the base plate 2) are not possible owing to the fact that the actuators 3 to 5 are attached to the base plate 2 and that the ends of the extensions of the arms 13 to 15 (such as the extensions 16, 17 of the arm 15) describe a fixed circle around the driven shaft (5A) of the corresponding actuator (5). The maximum amplitudes of these motions are a function of the lengths of the cranks (6,7) and of the characteristics of the joints 10 to 12. Through the device used to compensate for the weight of the load, the energy of the actuators 3 to 5 is used only to overcome the forces of friction and the inertia values of the mobile parts of the device of the invention. This entails low expenditure in electric power.

Figure 4A:
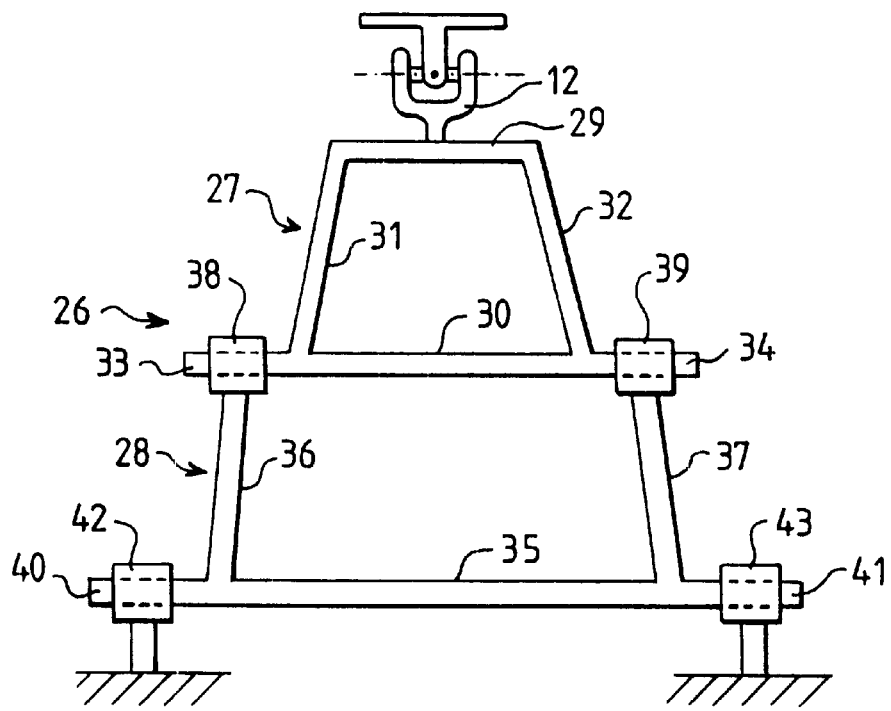
FIG. 4 shows a partial and schematized view of another embodiment of the device of FIG. 1, with pantograph-based hinged couplings, the FIG. 4A being a plane view of a connection of this kind in unfolded form.
Figure 4:
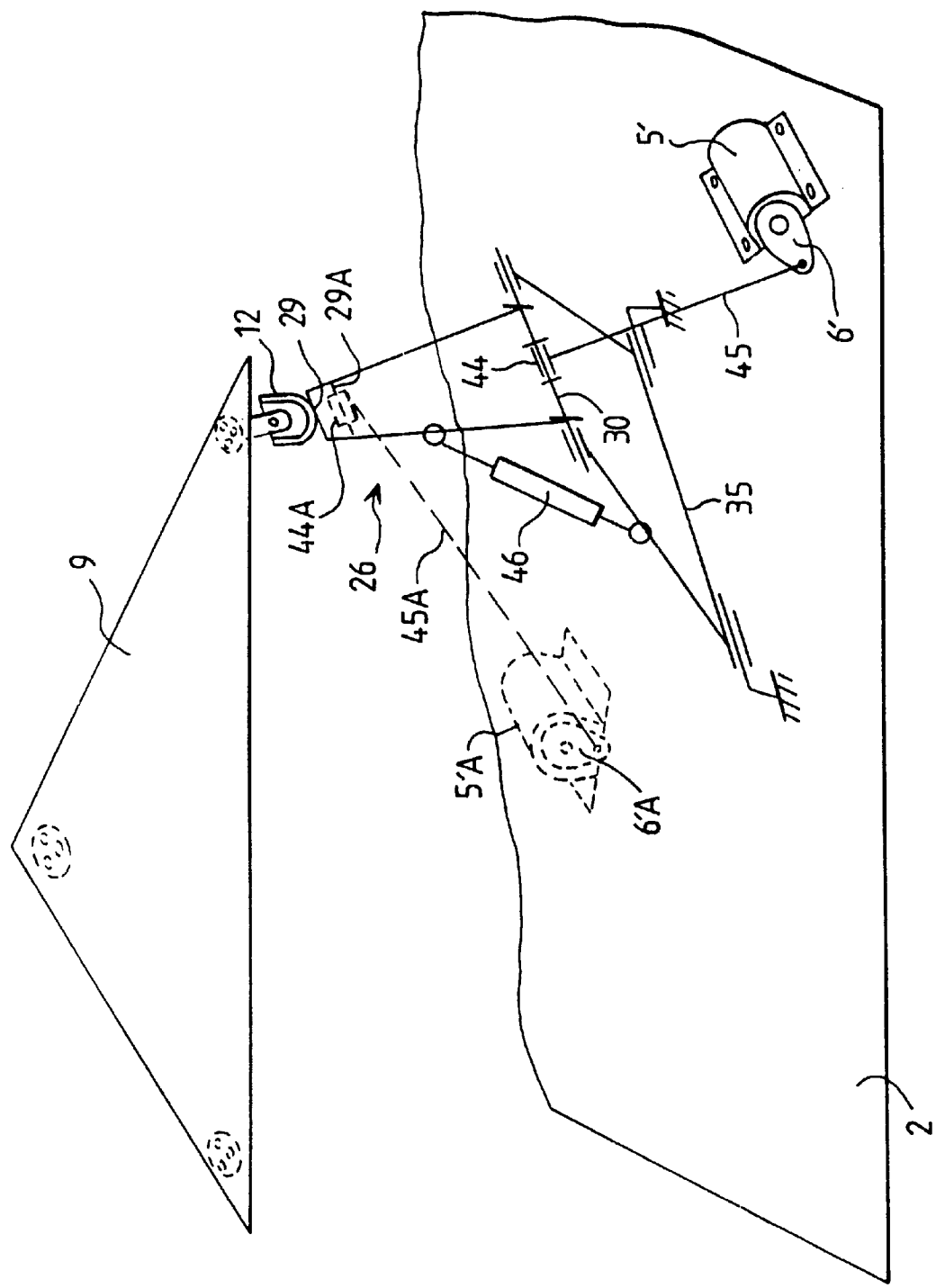

FIGS. 4 and 4A show an alternative embodiment of the arms 13 to 15 of FIG. 1. Only one of the three arms, referenced 26, has been shown. The other two arms are identical to this arm 26. This arm 26 has the general shape of a rectangular trapezoid. It consists of two rigid half-trapezoids 27, 28 of appreciably equal height. The first of these two half-trapezoids, 27, comprises two mutually parallel transversal arms, 29 and 30, connected by two oblique arms 31, 32. The joint 12 is fixed on one side to the arm 29 and, on the other side, to a corner of the platform 9. The arm 30 is extended on each side by an extension 33, 34. The second half-trapezoid 28 is hinged on these extensions 33, 34.

This half-trapezoid 28 comprises a transversal arm 35 and two oblique arms 36, 37 ending in sleeves or bearings 38, 39 threaded on the extensions 33, 34 on which these sleeves turn freely with minimum play. Thus, the arm 30 constitutes the fourth side of the trapezoid 28. The arm 35 is extended on each side by extensions 40, 41 turning freely in bearings 42, 43 fixed to the base plate 2. Naturally, the arms of each of the two half-trapezoids are rigidly connected to each other.

The corresponding actuator, referenced 5', comprises, in the present case, only one driven shaft, to which the crank 6' is fixed. A bearing 44 is mounted on the arm 30. A rod 45 connects the crank 6' to the bearing 44. According to the alternative shown in dashes in FIG. 4, the actuator 5' is replaced by an actuator 5'A that is identical but positioned nearer to the center of the base plate 2. The actuator 5'A drives a crank 6'A connected by a rod 45A to a bearing 44A mounted on an arm 29A, parallel to the arm 29 and close to it. Thus, the amount of space required by the motion device of the invention is reduced. The respective locations of the actuator 5' and of the bearings 42, 43, as well as the respective dimensions of the crank 6', the rod 45 and the arm 26 are such that a full rotation by one turn of the crank 6' makes the arm 26 go from a state of maximum extension (where the half-trapezoids 27 and 28 are coplanar) to a state of maximum inflection (as permitted by the joints 10 to 12 and/or sufficient for the needs of the simulator). As in the embodiments described above, there is provided a compensation device to compensate for the weight of the load of the platform 9. This device may be like the one of FIG. 1. Another embodiment is shown in FIG. 4. This compensation device comprises, for each arm such as the arm 26, at least one pneumatic jack or calibrated spring 46 positioned, for example, between an oblique arm of a half-trapezoid and the corresponding oblique arm of the other half-trapezoid of the arm. In FIG. 4, this jack is positioned between the arms 31 and 36. To obtain greater balance for the arm, it is possible to position another jack between the arms 32 and 37. As an alternative, only one jack is used, positioned between the midpoints of the transversal arms 29 and 35.

Figure 5:
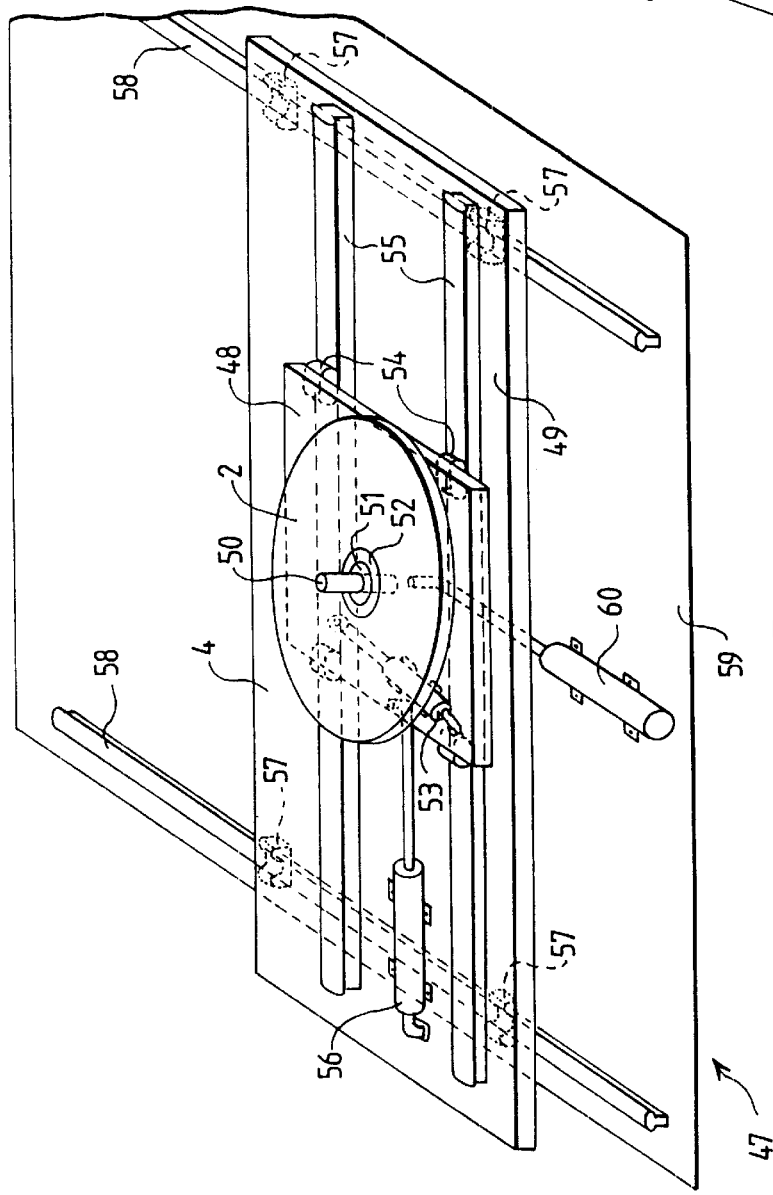
FIG. 5 shows a simplified view in perspective of an alternative embodiment of the device according to the invention, enabling motions with more than three degrees of freedom.

The motion device 47 shown in a simplified way in FIG. 5 makes it possible to obtain motions other than those permitted by the above-described device 1. These motions are at least one of the following: yawing motions, longitudinal motions (known as "X" motions) and transversal motions (known as "Y" motions).

The device 47 comprises, in addition to the device 1 (of which only the base plate 2 has been shown in order to simplify the drawing), one or two additional, superimposed mobile base plates depending on the number of additional motions desired. The embodiment described here below comprises two additional mobile base plates 48 and 49. The base plates 2, 48 and 49 are plane plates.

The base plate 48, which is square-shaped for example, comprises at its center a shaft 50 perpendicular to its surface and pointing upwards. This shaft 50 goes through an aperture 51, for example a circular aperture, made in the center of the base plate 2, and supports the base plate 2 by means of a bearing 52, enabling the base plate 2 to rotate freely around the shaft 50 at a distance from the base plate 48 that is sufficient to house a jack 53 between these base plates. This jack 53 is fixed, on one side, by a joint, to the base plate 48 and, on the other side, by another joint, to the base plate 2, so as to provide for the limited rotation of the base plate 2 with respect to the base plate 48, the latter being held still in rotation.

On its lower face, the base plate 48 has casters enabling it to move longitudinally (horizontally, towards the left and towards the right in the drawing of FIG. 5) on rails 55 fixed to the base plate 49. This base plate 49 has an elongated rectangular shape, with a length sufficient to enable the base plate 48, and with it the base plate 2, to be moved in longitudinal motions of maximum amplitude. To this end, a longitudinally positioned jack 56 is fixed between the base plate 49 and the base plate 48.

In turn, the base plate 49 comprises casters on its lower face, enabling it to move transversely (perpendicularly to the plane of FIG. 5) on rails 58 (perpendicular to the rails 55) fixed to a base 59 fixed to the ground, the base plate 49 moving under the action of one (or more ) jacks 60 fixed to the base 59 and the base plate 49.

Of course, the base plate 2 can support more than three actuators. In every case, the centers of these actuators are placed at the vertices of a polygon which is preferably a regular polygon. The approaches using more than three actuators are less economical than those using three, but they make it possible to communicate <<purer>> angular motions (i.e. pure roll or pure pitch motions) to the load.

What is claimed is:

1. A device for putting a load into motion with at least three degrees of freedom, comprising at least three actuators, each fixed to a supporting base plate at vertices of a substantially regular polygon, each of the actuators rotationally driving a crank connected by a hinged coupling to a fixing point at a corresponding corner of a platform to which the load is fixed, the fixing points on the platform forming vertices of a polygon whose shape is appreciably homothetical to that of the polygon whose vertices are occupied by the actuators, wherein each hinged coupling comprises at least one connection element having a first end connected to the platform by a ball-and-socket type joint, and a second end connected to at least one joint that is rotationally mobile, each of the connection elements having hinging points that are appreciably coplanar along a plane being mobile about a horizontal axis passing through an axis of a joint that joins the connection element to the platform.

2. A device according to claim 1, wherein each actuator has two coaxial driven shafts, on each one of which there is mounted the crank, the two cranks of each actuator being fixed in the same angular position with respect to the common axis of the driven shafts, each of the connection elements having an appreciably triangular shape having ends that are connected by a rotary joint to the corresponding cranks, and having a corner that is connected by a ball-and-socket type joint to the corresponding corner of the platform.

3. A device according to claim 4, further comprising a load compensation device including, for each hinged coupling, at least one elongated element with an adjustable spring function positioned between two arms of the pantograph.

4. A device according to claim 1, wherein each hinged coupling comprises a pantograph formed by two rigid half-trapezoids that are mutually hinged around a median transversal arm that is connected in a hinged way to the crank, one of the two half-trapezoids constituting said connection element, and the other half-trapezoid being mounted on bearings fixed to the base plate.

5. A device according to claim 1, the at least three actuators are positioned in an equilateral triangle configuration.

6. A device according to claim 1, further comprising a load compensation device including a single elongated element with an adjustable spring function, having one end connected by a joint to a center of the supporting base plate and its other end connected by another joint to a center of gravity of the platform.

7. A device according to claim 1, further comprising a load compensation device including three elongated elements with an adjustable spring function hinged at each end and respectively connecting each of the corners of the platform to the corresponding corner of the supporting base plate.

8. A device according to claim 1, further comprising a load compensation device including three groups of two elongated elements with an adjustable spring function hinged at each end, the two elements of each group being connected at one of the ends thereof to an arm of the hinged coupling and, at the other end, to the driven shaft of the actuator.

9. A device according to claim 1 further comprising a load compensation device including, for each actuator, at least one element with a spring function positioned between the base plate and the driven shaft of the actuator.

10. A device according to claim 1, wherein the supporting base plate is a first base plate and further comprising a second base plate positioned under the first base plate to which there is fixed a shaft crossing a center of the first base plate, which is rotationally mobile about the shaft, under action of a jack connecting the first base plate with the second base plate.

11. A device according to claim 10, wherein the second base plate is provided with casters moving on first rails fixed to a third base plate.

12. A device according to claim 11, wherein the third base plate comprises casters moving on second rails fixed to a pedestal and perpendicular to the first rails.

* * * * *